(12) United States Patent
Tian et al.

(10) Patent No.: US 11,140,914 B2
(45) Date of Patent: Oct. 12, 2021

(54) PRODUCTION METHOD OF NORMAL-TEMPERATURE INSTANT COOKED RICE

(71) Applicant: Jiangnan University, Wuxi (CN)

(72) Inventors: Yaoqi Tian, Wuxi (CN); Rongrong Ma, Wuxi (CN); Jinling Zhan, Wuxi (CN); Bing Hu, Wuxi (CN); Zhengyu Jin, Wuxi (CN); Canxin Cai, Wuxi (CN); Long Chen, Wuxi (CN)

(73) Assignee: Jiangnan University, Wuxi (CN)

( * ) Notice: Subject to any disclaimer, the term of this patent is extended or adjusted under 35 U.S.C. 154(b) by 322 days.

(21) Appl. No.: 16/385,251

(22) Filed: Apr. 16, 2019

(65) Prior Publication Data

US 2019/0261661 A1    Aug. 29, 2019

Related U.S. Application Data

(63) Continuation of application No. PCT/CN2018/090339, filed on Jun. 8, 2018.

(30) Foreign Application Priority Data

Feb. 6, 2018 (CN) .......................... 201810116912.3

(51) Int. Cl.
*A23L 7/196* (2016.01)
*A23L 27/20* (2016.01)
*A23L 7/10* (2016.01)

(52) U.S. Cl.
CPC ........... *A23L 7/1965* (2016.08); *A23L 7/1975* (2016.08); *A23L 27/2026* (2016.08);
(Continued)

(58) Field of Classification Search
CPC ..... A23L 7/1965; A23L 27/2054; A23L 7/197; A23L 7/1975; A23L 27/2052;
(Continued)

(56) References Cited

FOREIGN PATENT DOCUMENTS

| CN | 101331972 A | 12/2008 |
|----|-------------|---------|
| CN | 102342447 A | 2/2012 |
| WO | 03103414 A1 | 12/2003 |

OTHER PUBLICATIONS

Yao et al. CN1276175A—Machine translation of description—Dec. 13, 2000 (Year: 2000).*

(Continued)

*Primary Examiner* — Subbalakshmi Prakash
(74) *Attorney, Agent, or Firm* — IPro, PLLC

(57) ABSTRACT

The present disclosure discloses a production method of normal-temperature instant cooked rice and belongs to the technical field of food processing. The method of the present disclosure comprises the main steps of rice washing and soaking, flavor blending, sub-packaging, cooking, sterile vacuum sealing, cooling and crystallization and normal-temperature storage, wherein an aqueous solution containing flavor substances is adopted to perform flavor blending, and a fast cooling mode is adopted to perform cooling and crystallization. The normal-temperature instant cooked rice obtained through the production method provided in the present disclosure can keep the original flavor after being stored for 90 days.

9 Claims, 5 Drawing Sheets

(52) U.S. Cl.
CPC ....... *A23L 27/2028* (2016.08); *A23L 27/2052* (2016.08); *A23L 27/2054* (2016.08); *A23V 2002/00* (2013.01)

(58) Field of Classification Search
CPC .. A23L 27/2028; A23L 27/2026; A23L 27/20; A23V 2002/00
See application file for complete search history.

(56) References Cited

OTHER PUBLICATIONS

Chen et al. CN104286697A—Machine translation of description—Jan. 21, 2015 (Year: 2015).*

Buttery et al. Contribution of Volatiles to Rice Aroma. J. Agric. Food Chem. 1988, 36, 1006-1009 (Year: 1988).*

Yu et al. Impact of cooling rates on the staling behavior of cooked rice during storage. Journal of Food Engineering 96 (2010) 416-420 (Year: 2010).*

\* cited by examiner

PRODUCTION METHOD OF NORMAL-TEMPERATURE INSTANT COOKED RICE

TECHNICAL FIELD

The present disclosure relates to a production method of normal-temperature instant cooked rice and belongs to the technical field of food processing.

BACKGROUND

Rice is a finished product prepared from rough rice through processes of clearing, hulling, milling, finished product sorting and the like. The rice contains about 75% of carbohydrates, 7%-8% of proteins and 1.3%-1.8% of fat and is rich in B vitamins and the like. The carbohydrates in the rice mainly include starch; the proteins in the rice mainly include rice gluten and secondly include oryzenin and globulin; the biological value and the amino acid composition ratio of the proteins in the rice are higher than those of cereal crops such as wheat, barley, millet and corn; and the digestibility of the proteins in the rice is 66.8%-83.1% which is also the higher one in cereal proteins. Rice is one of the staple foods of Asians such as Chinese, Japanese and Koreans.

The instant cooked rice refers to a staple food which is produced in an industrialized large scale and can be eaten only by being simply cooked before eating or can be eaten directly, and the flavor, taste and shape of the instant cooked rice are basically identical to those of common cooked rice. The instant cooked rice is divided into three types according to circulation environments, including frozen instant cooked rice, refrigerated instant cooked rice and normal-temperature instant cooked rice. With the development of the economic technology, the pace of people's life is accelerating, the normal-temperature instant cooked rice has been increasingly favored by consumers since it was put on the market due to the advantages of convenient eating, convenient storage, convenient carrying, safety, sanitation and the like.

The production processes of the instant cooked rice are different, but the cooked rice is required to be complete, well-defined, soft and strong as well as not sticky, and the normal fragrance of the cooked rice needs to be kept. However, during the storage process of the instant cooked rice common on the market, oxidation and hydrolysis of lipids in the cooked rice cause accumulation of a large amount of flavor substances such as aldehydes and ketones, which in turn cause the formation of furan and other deteriorated flavors and the loss of typical flavor substances in the cooked rice; at the same time, during the storage process of the instant cooked rice common on the market, the cooked rice will be aging and dehydrating, so that the problems of poor taste, flavor loss and deterioration generally exist, the sensory quality of the instant cooked rice is seriously influenced, and the development of the instant cooked rice industry is limited. Especially, because the normal-temperature instant cooked rice has relatively high storage temperature (room temperature) and long storage time, the normal-temperature instant cooked rice rarely has the fragrance of fresh cooked rice during eating, which seriously influences the desire of consumers for eating the normal-temperature instant cooked rice.

SUMMARY

The present disclosure provides a production method of normal-temperature instant cooked rice, which is mainly characterized in that small flavor molecules are added, and fast cooling and crystallization methods are utilized for reducing flavor loss and deterioration of the normal-temperature instant cooked rice. The normal-temperature instant cooked rice obtained through the production method provided in the present disclosure can keep good flavor after being stored for 90 days.

The production method of the normal-temperature instant cooked rice according to the present disclosure comprises the steps of rice washing and soaking, flavor blending, sub-packaging, cooking, sterile vacuum sealing, cooling and crystallization and normal-temperature storage, wherein the step of flavor blending adopts an aqueous solution containing flavor substances to blend the flavor; the step of cooling and crystallization adopts fast cooling and crystallization modes to coat the flavor substances so as to achieve the purpose of slowly releasing the flavor substances; the step of cooling and crystallization realizes fast cooling to 15 to 30 DEG C. in a low temperature environment of −70 to −10 DEG C., and the average cooling rate of the cooked rice is 5 to 11 DEG C./min.

In one example of the present disclosure, the drinking water of 10 to 40 DEG C. is used for washing and soaking rice.

In one example of the present disclosure, the flavor substances include one or combination of pyridines, pyrroles, esters and alcohols which are allowed to be added to the food; the concentration of the aqueous solution containing the flavor substances is 0.001 to 10 mg/kg; the flavor substances are preferably substances which do not influence the flavor of the cooked rice.

In one example of the present disclosure, the aqueous solution containing the flavor substances contains the following solutes (metered by per kilogram of flavor substances/per kilogram of water):

0.000004% to 0.000009% of 2-acetyl-1-pyrroline,
0.0000002% to 0.0000004% of 2-acetylpyridine,
0.0000005% to 0.0000009% of ethyl 2-methylpentanoate,
0.000002% to 0.000004% of gamma-decalactone,
0.0000003% to 0.0000005% of linalool,
0.0000001% to 0.0000003% of alpha-terpineol,
0.0000002% to 0.0000004% of 1-octen-3-ol,
0.00000004% to 0.0000006% of phenethyl alcohol.

The production method of the normal-temperature instant cooked rice comprises the following specific steps:

(1) rice washing and soaking: washing rice with drinking water of 10 to 40 DEG C., putting the rice into the drinking water to be soaked, and then, draining off the rice;

(2) flavor blending: preparing a stock solution containing 4% to 9% of 2-acetyl-1-pyrroline, 0.2% to 0.4% of 2-acetylpyridine, 0.5% to 0.9% of ethyl 2-methylpentanoate, 2% to 4% of gamma-decalactone, 0.3% to 0.5% of linalool, 0.1% to 0.3% of alpha-terpineol, 0.2% to 0.4% of 1-octen-3-ol and 0.4% to 0.6% of phenethyl alcohol; diluting the stock solution by $10^6$ times step by step, adding the rice under the condition that the mass ratio of the rice to the aqueous solution is 1:(1.0 to 1.8), and then, soaking the rice at 10 to 40 DEG C.;

(3) performing sub-packaging, cooking and sterile vacuum sealing;

(4) performing fast cooling and storage.

In one example of the present disclosure, the step (3) realizes sub-packaging of the cooked rice by adopting environment-friendly, high-temperature-resistant and high-pressure-resistant packaging boxes, normal-pressure cooking for 30 min and then sterile vacuum sealing.

In one example of the present disclosure, the fast cooling method in the step (4) realizes fast cooling of the sealed cooked rice to 15-30 DEG C. in the low temperature environment of −70 to −10 DEG C. by adopting an air cooling mode or a refrigeration house cooling mode, and the average cooling rate of the cooked rice is 5 to 11 DEG C./min.

In one example of the present disclosure, the average cooling rate of the cooked rice is 9 to 11 DEG C./min, 7 to 9 DEG C./min or 5 to 7 DEG C./min.

In one example of the present disclosure, the cooling modes adopted by cooling and crystallization include but not limited to the air cooling mode and the refrigeration house cooling mode.

The present disclosure has the following beneficial technical effects:

The starch is crystallized through fast cooling to coat flavor components to enable the flavor components to be slowly released, small molecules volatilize in the sealed space to achieve dynamic balance, and a proper amount of the flavor substances are added to effectively inhibit production of deteriorated flavor small molecules. If the addition amount is too low, the volatilization concentration of fragrant molecules in the sealed space is low, the fragrance perception is not obvious, and thus, volatilization of the deteriorated flavor is not inhibited sufficiently. If the addition amount is too high, the cost is increased, and too high concentration of the flavor substances causes pungent taste so that the fragrance perception is influenced.

The present disclosure adopts a fast cooling nucleation technology to fast cool the cooked rice to 15-30 DEG C. after sterile vacuum sealing. Compared with common slow cooling, nucleation modes are different: under common cooling conditions, starch molecular chains have enough time to combine with each other, tending to a continuous nucleation mode, but crystal growth is mainly formed in the later period of storage; however, the starch molecular chains have no time to combine with each other due to fast cooling, but a small helix (crystal nucleus) can be formed between chains close to each other, belonging to an instant nucleation mode which can achieve the purpose of fast coating small-molecule flavor components. Studies suggest that the crystal nucleus can be used as a promoter for long-term retrogradation of starch to achieve the effect of promoting retrogradation during long-term storage, the starch molecular chains can be continuously complexed with the flavor substances, and amylopectin plays a dominant role in the starch retrogradation process. Studies suggest that amylopectin retrogradation is reversible and can be eliminated in a cooked rice reheating process, and fragrance components can be released again. Compared with the prior art, the present disclosure overcomes the problem of flavor loss in the storage process of the traditional normal-temperature instant cooked rice, improves the taste quality of the instant cooked rice and increases the acceptability of the instant cooked rice.

BRIEF DESCRIPTION OF FIGURES

In FIGS. 2 to 5, the retention time of each flavor substance is as follows: 2-acetyl-1-pyrroline, about 10.5 min; 2-acetylpyridine, about 5.3 min; ethyl 2-methylpentanoate, about 19.8 min; gamma-decalactone, about 27.9 min; linalool, about 13.9 min; alpha-terpineol, about 12.2 min; 1-octen-3-ol, about 16.6 min; phenethyl alcohol, about 5.5 min.

DETAILED DESCRIPTION

Figure 1:
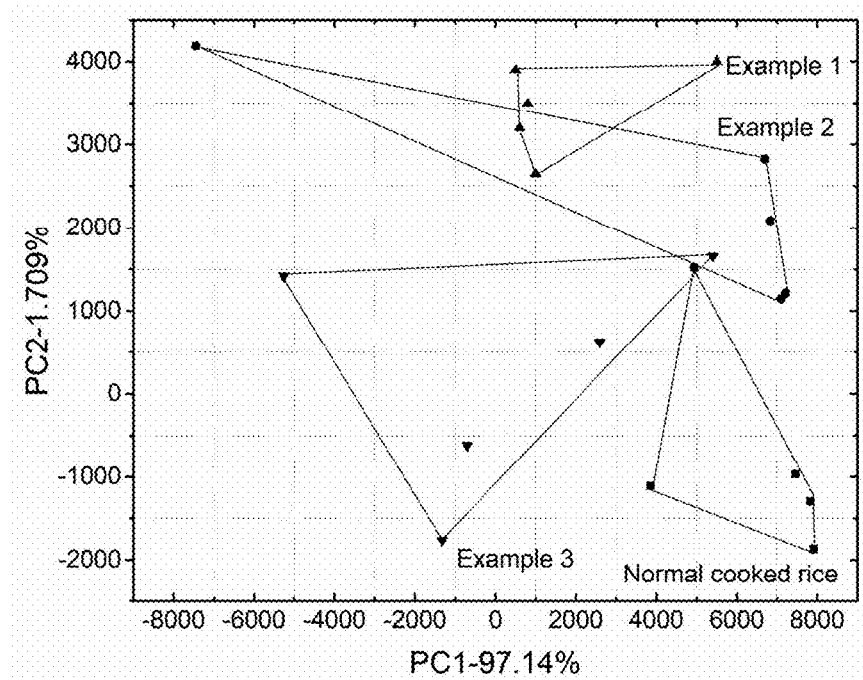
FIG. 1 is a PCA analysis diagram of a fast gas chromatography electronic nose for comparing instant cooked rice with normal cooked rice according to three examples.

The method for detecting the flavor substances in the cooked rice adopts the TSQ Quantum XLS gas chromatograph-mass spectrometer produced by the Thermo Fisher Scientific. Detection conditions: a solid-phase microextraction column carboxen/polydimethylsiloxane (1 cm, 75 μm, CAR/PDMS) and a DB-WAX separation column (30 m, 0.25 mm, i. d. 0.25 μm) are adopted. Chromatographic conditions: the injection port temperature is 270 DEG C., and the split ratio is 20:1; the initial temperature is 40 DEG C. and is kept for 3 min, then the initial temperature of 40 DEG C. is raised to 90 DEG C. at the rate of 5 DEG C./min, the temperature of 90 DEG C. is kept for 5 min and is then raised to 230 DEG C. at the rate of 10 DEG C./min, and the temperature of 230 DEG C. is kept for 7 min and resolved for 40 min; the carrier gas is He, the flow rate is 1 mL/min, the ionization mode is EI, the electron energy is 70 ev, and the ion source temperature is 230 DEG C.; the quadrupole temperature is 150 DEG C., and the transmission line temperature is 230 DEG C.; the scanning range is 35-350 m/z. The retention time of each flavor substance is as follows: 2-acetyl-1-pyrroline, about 10.5 min; 2-acetylpyridine, about 5.3 min; ethyl 2-methylpentanoate, about 19.8 min; gamma-decalactone, about 27.9 min; linalool, about 13.9 min; alpha-terpineol, about 12.2 min; 1-octen-3-ol, about 16.6 min; phenethyl alcohol, about 5.5 min.

A preparation method of fresh cooked rice comprises the following steps: washing rice twice with drinking water at about 20 DEG C., then putting the rice into a proper amount of drinking water to be soaked for 30 min, draining off the rice, sub-packaging the rice by adopting environment-friendly, high-temperature-resistant and high-pressure-resistant packaging boxes under the condition that the mass ratio of the rice to the water is 1:1.4, cooking the rice for 30 min at normal pressure, and naturally cooling the cooked rice at normal temperature.

Example 1

Figure 2:
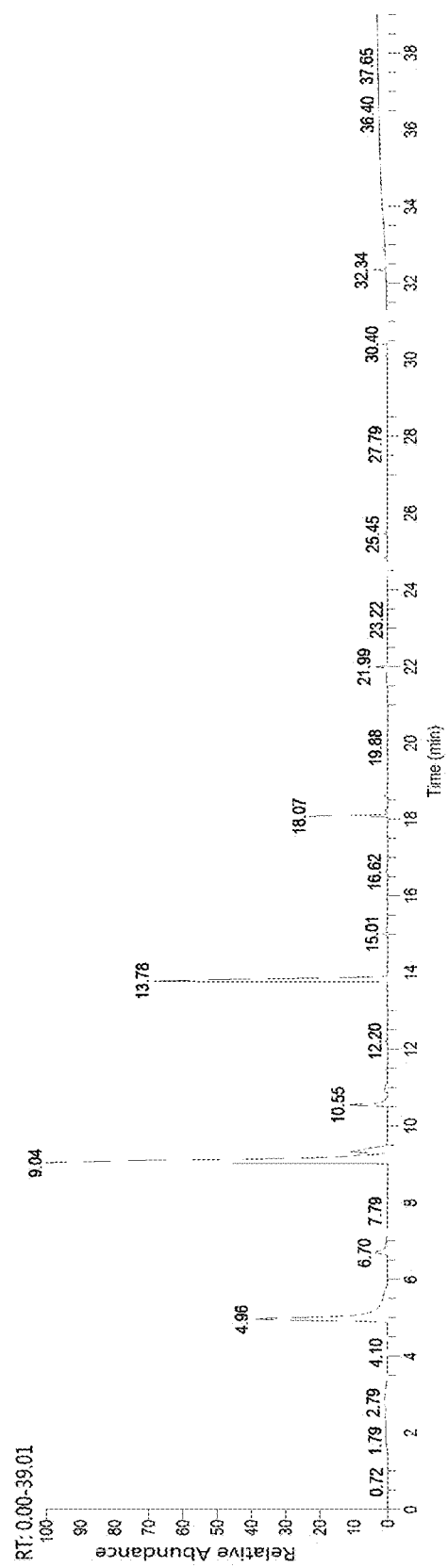
FIG. 2 is a headspace solid-phase microextraction-gas chromatography-mass spectrometry diagram immediately after the rice without adding the aqueous solution containing the flavor substances is cooked.

Washing rice twice with drinking water at about 10 DEG C., and then, putting the rice into a proper amount of drinking water to be soaked for 30 min; preparing a stock solution of an aqueous solution containing 4% of 2-acetyl-1-pyrroline, 0.2% of 2-acetylpyridine, 0.9% of ethyl 2-methylpentanoate, 2% of gamma-decalactone, 0.5% of linalool, 0.2% of alpha-terpineol, 0.2% of 1-octen-3-ol and 0.5% of phenethyl alcohol; diluting the stock solution by $10^6$ times to obtain the aqueous solution containing the flavor substances;

mixing the rice with the aqueous solution containing the flavor substances in a mass ratio of 1:1.4, and soaking the rice; sub-packaging the rice by adopting environment-friendly, high-temperature-resistant and high-pressure-resistant packaging boxes, cooking the rice for 30 min at normal pressure, and then, performing sterile vacuum sealing; after the sealing is finished, fast cooling the cooked rice by adopting a refrigeration house cooling mode in the low temperature environment of −70 DEG C. at the average cooling rate of 9 to 11 DEG C./min until the central temperature of the cooked rice is reduced to 15 DEG C., and then, storing the cooked rice at normal temperature;

and after the cooked rice is stored for 90 days at normal temperature, analyzing volatile odor components of the obtained instant cooked rice and fresh cooked rice by utilizing the headspace solid-phase microextraction-gas chromatography-mass spectrometry technology. As shown in FIG. 1 and FIG. 2, the contents and varieties of the volatile smell components released by the instant cooked rice obtained by the example and the fresh cooked rice are approximately identical. The fast gas chromatography electronic nose is utilized for detecting the flavors of the instant cooked rice obtained by the example and the fresh cooked rice, and the results show that the two flavors have no significant difference.

Example 2

Figure 3:
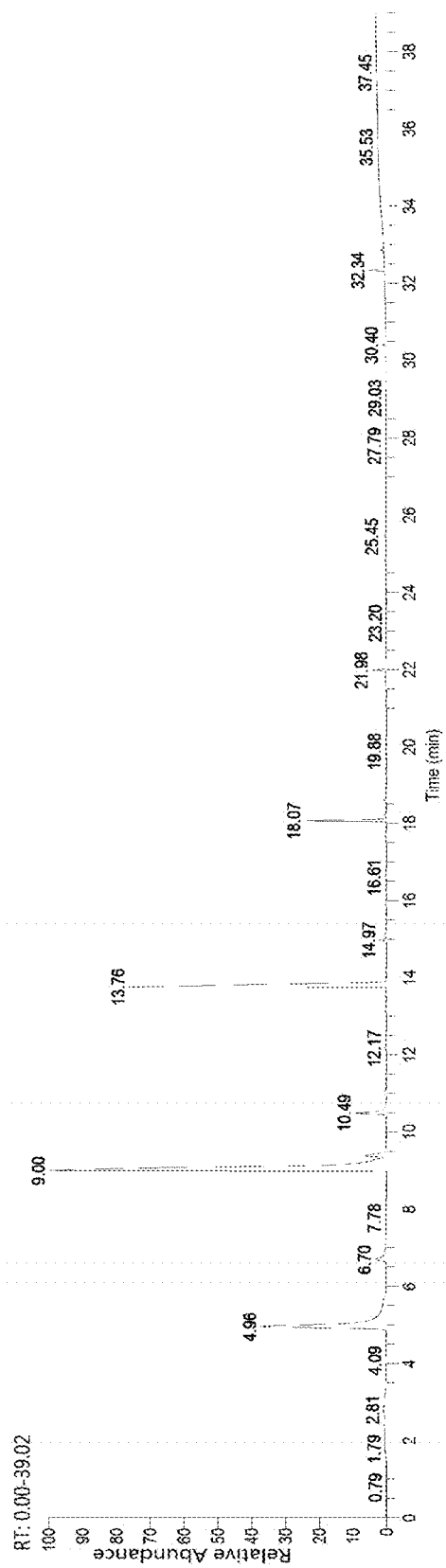
FIG. 3 is a headspace solid-phase microextraction-gas chromatography-mass spectrometry diagram of the normal-temperature instant cooked rice stored for 90 days in the example 1.

Washing rice twice with drinking water at about 40 DEG C., and then, putting the rice into a proper amount of drinking water to be soaked for 30 min; preparing a stock solution of an aqueous solution containing 9% of 2-acetyl-1-pyrroline, 0.4% of 2-acetylpyridine, 0.5% of ethyl 2-methylpentanoate, 4% of gamma-decalactone, 0.3% of linalool, 0.1% of alpha-terpineol, 0.4% of 1-octen-3-ol and 0.4% of phenethyl alcohol; diluting the stock solution by $10^6$ times to obtain the aqueous solution containing the flavor substances;

mixing the rice with the aqueous solution containing the flavor substances in a mass ratio of 1:1.4, and soaking the rice; sub-packaging the rice by adopting environment-friendly, high-temperature-resistant and high-pressure-resistant packaging boxes, cooking the rice for 30 min at normal pressure, and then, performing sterile vacuum sealing; after the sealing is finished, fast cooling the cooked rice by adopting an air cooling mode in the low temperature environment of −40 DEG C. at the average cooling rate of 7 to 9 DEG C./min until the central temperature of the cooked rice is reduced to 25 DEG C., and then, storing the cooked rice at normal temperature;

and after the cooked rice is stored for 90 days at normal temperature, analyzing volatile odor components of the obtained instant cooked rice and fresh cooked rice by utilizing the headspace solid-phase microextraction-gas chromatography-mass spectrometry technology. As shown in FIG. 1 and FIG. 3, the contents and varieties of the volatile smell components released by the instant cooked rice obtained by the example and the fresh cooked rice are approximately identical. The fast gas chromatography electronic nose is utilized for detecting the flavors of the instant cooked rice obtained by the example and the fresh cooked rice, and the results show that the two flavors have no significant difference.

Example 3

Figure 4:
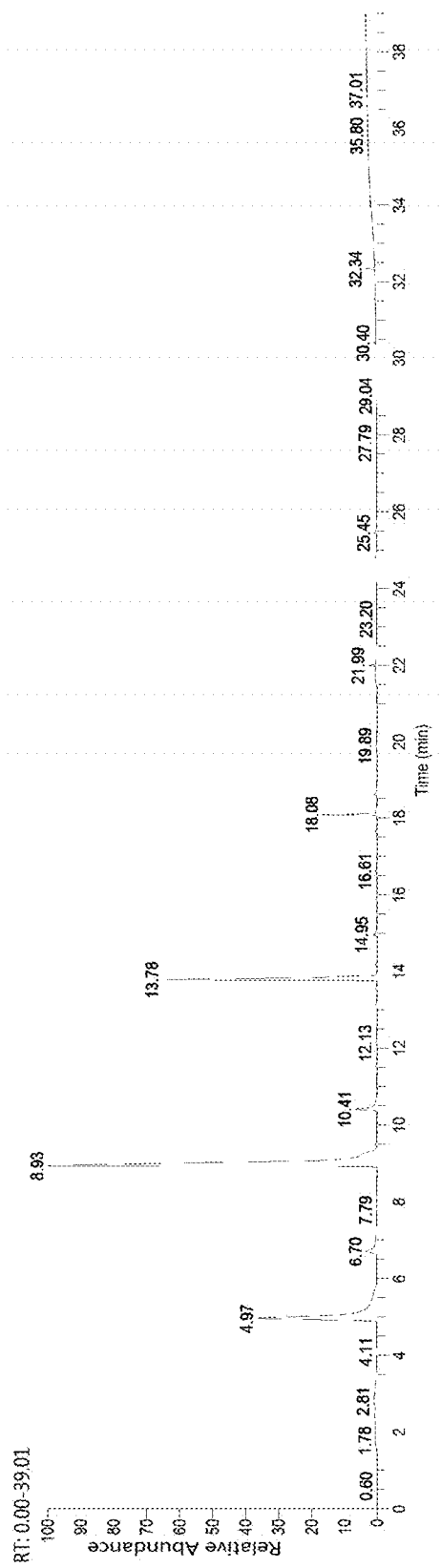
FIG. 4 is a headspace solid-phase microextraction-gas chromatography-mass spectrometry diagram of the normal-temperature instant cooked rice stored for 90 days in the example 2.
Figure 5:
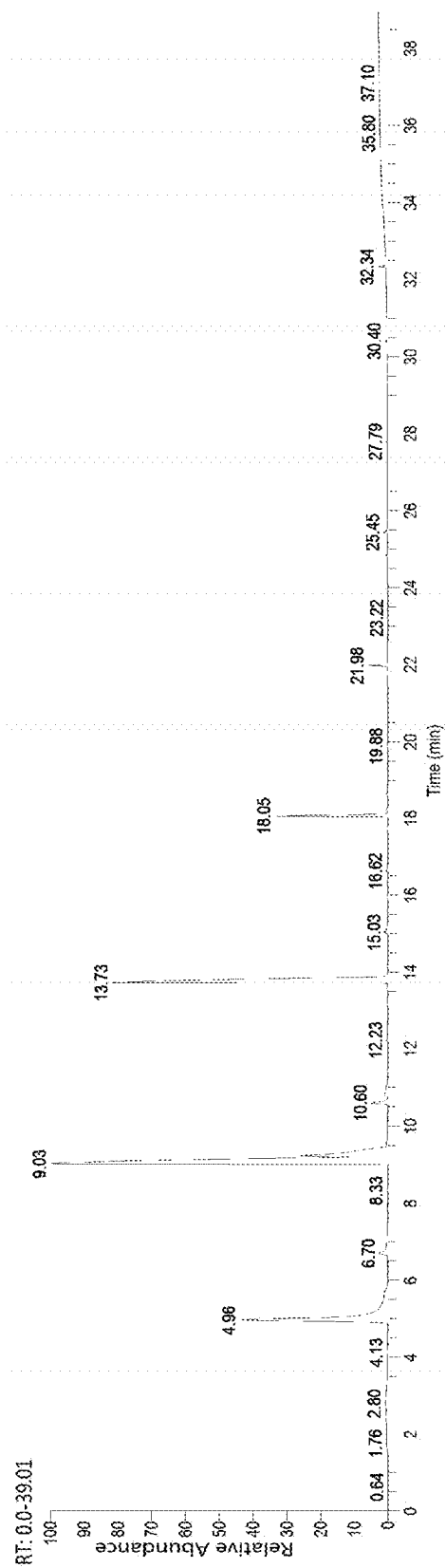
FIG. 5 is a headspace solid-phase microextraction-gas chromatography-mass spectrometry diagram of the normal-temperature instant cooked rice stored for 90 days in the example 3.

Washing rice thrice with drinking water at about 25 DEG C., and then, putting the rice into a proper amount of drinking water to be soaked for 30 min; preparing a stock solution of an aqueous solution containing 6% of 2-acetyl-1-pyrroline, 0.3% of 2-acetylpyridine, 0.7% of ethyl 2-methylpentanoate, 3% of gamma-decalactone, 0.4% of linalool, 0.3% of alpha-terpineol, 0.3% of 1-octen-3-ol and 0.6% phenethyl alcohol; diluting the stock solution by $10^6$ times to obtain the aqueous solution containing the flavor substances;

mixing the rice with the aqueous solution containing the flavor substances in a mass ratio of 1:1.4, and soaking the rice; sub-packaging the rice by adopting environment-friendly, high-temperature-resistant and high-pressure-resistant packaging boxes, cooking the rice for 30 min at normal pressure, and then, performing sterile vacuum sealing; after the sealing is finished, fast cooling the cooked rice by adopting an air cooling mode in the low temperature environment of −10 DEG C. at the average cooling rate of 5 to 7 DEG C./min until the central temperature of the cooked rice is reduced to 30 DEG C., and then, storing the cooked rice at normal temperature;

and after the cooked rice is stored for 90 days at normal temperature, analyzing volatile odor components of the obtained instant cooked rice and fresh cooked rice by utilizing the headspace solid-phase microextraction-gas chromatography-mass spectrometry technology. As shown in FIG. 1 and FIG. 4, the contents and varieties of the volatile smell components released by the instant cooked rice obtained by the example and the fresh cooked rice are approximately identical. The fast gas chromatography electronic nose is utilized for detecting the flavors of the instant cooked rice obtained by the example and the fresh cooked rice, and the results show that the two flavors have no significant difference.

TABLE 1 contents (mg/kg) of eight flavor substances in examples 1-3
Influence on contents (mg/kg) of typical flavor substances in cooked rice by cooling rate:

|  | 1 | 2 | 3 | 4 | 5 | 6 | 7 | 8 |
|---|---|---|---|---|---|---|---|---|
| Fresh cooked rice | 0.0491 ± 0.0047 | 0.0195 ± 0.0027 | 0.0512 ± 0.0053 | 0.0483 ± 0.0035 | 0.0685 ± 0.0049 | 0.1194 ± 0.0106 | 0.1529 ± 0.0092 | 0.1639 ± 0.0137 |
| Example 1 | 0.0420 ± 0.0070 | 0.0180 ± 0.0026 | 0.0397 ± 0.0055 | 0.0353 ± 0.0065 | 0.0510 ± 0.0056 | 0.1087 ± 0.0152 | 0.1180 ± 0.0085 | 0.0890 ± 0.0106 |
| Example 2 | 0.0842 ± 0.0021 | 0.0321 ± 0.0036 | 0.0528 ± 0.0067 | 0.0639 ± 0.0058 | 0.0416 ± 0.0047 | 0.0907 ± 0.0133 | 0.1504 ± 0.0081 | 0.1402 ± 0.0112 |
| Example 3 | 0.0669 ± 0.0072 | 0.0301 ± 0.0046 | 0.0625 ± 0.0093 | 0.0426 ± 0.0068 | 0.0573 ± 0.0039 | 0.1009 ± 0.0156 | 0.1634 ± 0.0126 | 0.1723 ± 0.0089 |

Washing rice twice with drinking water at about 10 DEG C., and then, putting the rice into a proper amount of drinking water to be soaked for 30 min; preparing a stock solution of an aqueous solution containing 4% of 2-acetyl- 1-pyrroline, 0.2% of 2-acetylpyridine, 0.9% of ethyl 2-methylpentanoate, 2% of gamma-decalactone, 0.5% of linalool, 0.2% of alpha-terpineol, 0.2% of 1-octen-3-ol and 0.5% of phenethyl alcohol; diluting the stock solution by $10^6$ times to obtain the aqueous solution containing the flavor substances;

mixing the rice with the aqueous solution containing the flavor substances in a mass ratio of 1:1.4, and soaking the rice; sub-packaging the rice by adopting environment-friendly, high-temperature-resistant and high-pressure-resistant packaging boxes, cooking the rice for 30 min at normal pressure, and then, performing sterile vacuum sealing; after the sealing is finished, fast cooling the cooked rice by adopting a refrigeration house cooling mode in the low temperature environment of −70 DEG C. at the average cooling rates of 1 to 3 DEG C./min, 3 to 5 DEG C./min, 5 to 7 DEG C./min, 7 to 9 DEG C./min or 9 to 11 DEG C./min until the central temperature of the cooked rice is reduced to 15 DEG C., and then, storing the cooked rice at normal temperature; and after the cooked rice is stored for 90 days at normal temperature, analyzing volatile odor components of the obtained instant cooked rice and fresh cooked rice by utilizing the headspace solid-phase microextraction-gas chromatography-mass spectrometry technology. The results are as shown in table 2.

TABLE 2 influence on contents (mg/kg) of typical flavor substances in cooked rice by cooling rate

| | 1 | | 2 | | 3 | | 4 | |
|---|---|---|---|---|---|---|---|---|
| | 0 d | 90 d | 0 d | 90 d | 0 d | 90 d | 0 d | 90 d |
| Common cooling (0.49 DEG C./min) | 0.0570 ± 0.0056a | NDb | 0.0207 ± 0.0035a** | 0.0020 ± 0.0036b** | 0.0607 ± 0.0081a** | 0.0100 ± 0.0044c** | 0.0497 ± 0.0042a** | 0.0033 ± 0.0058d** |
| 1~3 DEG C./min | 0.0577 ± 0.0050a | 0.1367 ± 0.1041a | 0.0200 ± 0.0020a** | 0.0080 ± 0.0036ab** | 0.0603 ± 0.0045a** | 0.0200 ± 0.0026bc** | 0.0503 ± 0.0025a** | 0.0073 ± 0.0025cd** |
| 3~5 DEG C./min | 0.0603 ± 0.0057a** | 0.0290 ± 0.0061ab** | 0.0203 ± 0.0038a* | 0.0113 ± 0.0032ab* | 0.0607 ± 0.0097a** | 0.0177 ± 0.0068bc** | 0.0497 ± 0.0032a** | 0.0210 ± 0.0066bc** |
| 5~7 DEG C./min | 0.0560 ± 0.0096a | 0.0537 ± 0.0100ab | 0.0203 ± 0.0099a | 0.0173 ± 0.0090a | 0.0607 ± 0.0097a** | 0.0293 ± 0.0012b** | 0.0500 ± 0.0026a* | 0.0410 ± 0.0046a* |
| 7~9 DEG C./min | 0.0563 ± 0.0132a | 0.0543 ± 0.0100ab | 0.0220 ± 0.0088a | 0.0187 ± 0.0075a | 0.0600 ± 0.0115a | 0.0557 ± 0.0135a | 0.0503 ± 0.0074a | 0.0483 ± 0.0081a |
| 9~11 DEG C./min | 0.0500 ± 0.0115a | 0.0420 ± 0.0070ab | 0.0200 ± 0.0020a* | 0.0180 ± 0.0026ab* | 0.0610 ± 0.0095a* | 0.0397 ± 0.0055b* | 0.0500 ± 0.0096a | 0.0353 ± 0.0065ab |

| | 5 | | 6 | | 7 | | 8 | |
|---|---|---|---|---|---|---|---|---|
| | 0 d | 90 d | 0 d | 90 d | 0 d | 90 d | 0 d | 90 d |
| Common cooling (0.49 DEG C./min) | 0.0700 ± 0.0044a** | 0.0097 ± 0.0021c** | 0.139 ± 0.0127a** | 0.0197 ± 0.0025d** | 0.1403 ± 0.0100a** | 0.0027 ± 0.0025c** | 0.1507 ± 0.0126a** | 0.0393 ± 0.0025c** |
| 1~3 DEG C./min | 0.0693 ± 0.0025a** | 0.0117 ± 0.0025c** | 0.0996 ± 0.0752a | 0.0537 ± 0.0107cd | 0.1417 ± 0.0075a** | 0.0380 ± 0.0095b** | 0.1503 ± 0.0029a** | 0.0573 ± 0.0115bc** |
| 3~5 DEG C./min | 0.0701 ± 0.0056a** | 0.0323 ± 0.0023b** | 0.1373 ± 0.0115a* | 0.0803 ± 0.0251bc* | 0.1403 ± 0.0060a* | 0.1083 ± 0.0161a* | 0.1527 ± 0.0092a** | 0.0733 ± 0.0136ab** |
| 5~7 DEG C./min | 0.0697 ± 0.0078a | 0.0563 ± 0.0064a | 0.1470 ± 0.0085a* | 0.1220 ± 0.0124a* | 0.1417 ± 0.0067a | 0.1170 ± 0.0151a | 0.1493 ± 0.0092a* | 0.0753 ± 0.0055ab* |
| 7~9 DEG C./min | 0.0693 ± 0.0051a | 0.0660 ± 0.0061a | 0.1490 ± 0.0061a | 0.1447 ± 0.0038a | 0.1420 ± 0.0087a | 0.1383 ± 0.0100a | 0.1497 ± 0.0080a* | 0.0960 ± 0.0115a* |
| 9~11 DEG C./min | 0.0677 ± 0.0091a | 0.0510 ± 0.0056b | 0.1373 ± 0.0085a | 0.1087 ± 0.0152ab | 0.1427 ± 0.0060a* | 0.1180 ± 0.0085a* | 0.1509 ± 0.0096a* | 0.0890 ± 0.0106b* |

Note:
compound 1: 2-acetyl-1-pyrroline; compound 2: 2-acetylpyridine; compound 3: ethyl 2-methylpentanoate; compound 4: gamma-decalactone; compound 5: linalool; compound 6: alpha-terpineol; compound 7: 1-octen-3-ol; compound 8: phenethyl alcohol; data = average value ± standard deviation (n = 3).
ND means not detected.
The same English letters in the same column in the table indicate that the differences are not significant (p < 0.05), 0 day compared with 90 days, **indicates that the differences are extremely significant, *indicates that the differences are significant, and no mark indicates that there is no significant difference.

As shown in table 2, at 0 day, with the increase of the cooling rate, the flavor components have no significant difference; and after the cooked rice is stored for 90 days, with the increase of the cooling rate, the contents of the flavor compounds firstly increase and then decrease, the reason is that fast cooling ensures fast nucleation of starch to promote coating of the flavor substances, but too fast cooling rate may cause the starch molecular chains to have no time to combine to each other, and the nucleation rate decreases so as to cause the loss of the flavor substances. Seen from table 1, the optimal cooling rate is 7 to 9 DEG C./min, and the secondary cooling rate is 5 to 7 DEG C./min. At the same cooling rate, the differences of the flavors at 0 day and 90 days are compared, the comparison results show that when a common cooling rate is adopted, the differences of all compounds are extremely significant; when the cooling rate of 7 to 9 DEG C./min is adopted, most of the flavor components at 0 day and 90 days basically have no significant difference; and when the cooling rate of 5 to 7 DEG C./min is adopted, the effect is secondary. In conclusion, the cooling rate is controlled to be 5 to 9 DEG C./min so as to be most favorable for keeping the flavor of the cooked rice.

What is claimed is:

1. A method of cooking rice, which comprises:
   washing the rice,
   soaking the rice,
   blending the rice with flavor substances comprising volatile odor components in an aqueous solution,
   packaging the rice into containers,
   cooking the rice,
   sterile vacuum sealing the rice, and
   cooling the rice quickly thereby crystallizing starch within the rice, wherein cooling is performed at a rate of 5 to 11° C. per minute at a temperature of −70 to −10° C., such that the rice reaches a final temperature of 15 to 30° C.,
   wherein the volatile odor components released from the cooked rice 90 days after cooking and cooling the rice when stored at room temperature are retained as compared with the volatile odor components released from the cooked rice on the day of cooking and cooling the rice, and
   wherein the volatile odor components comprise one or more of pyridines, pyrroles, esters, and alcohols.

2. The method of claim 1, wherein the cooling comprises applying an air cooling mode and a refrigeration house cooling mode.

3. The method of claim 1, wherein the concentration of the flavor substances is 0.001 to 10 mg/kg in the aqueous solution.

4. The method of claim 1, wherein the aqueous solution comprising the flavor substances comprises the following solutes (per kilogram of flavor substances/per kilogram of water):
   0.000004% to 0.000009% of 2-acetyl-1-pyrroline,
   0.0000002% to 0.0000004% of 2-acetylpyridine,
   0.0000005% to 0.0000009% of ethyl 2-methylpentanoate,
   0.000002% to 0.000004% of gamma-decalactone,
   0.0000003% to 0.0000005% of linalool,
   0.0000001% to 0.0000003% of alpha-terpineol,
   0.0000002% to 0.0000004% of 1-octen-3-ol, and
   0.0000004% to 0.0000006% of phenethyl alcohol.

5. The method of claim 1, wherein of washing and soaking is achieved with drinking water at a temperature of 10 to 40° C.

6. The method of claim 1, wherein:
   (a) washing and soaking the rice comprises: washing the rice with drinking water at 10 to 40° C. to provide washed rice, soaking the washed rice in the drinking water, and then, draining the drinking water from the rice; and
   (b) blending the rice with flavor substances comprises:
   (aa) preparing a stock solution comprising 4% to 9% of 2-acetyl-1-pyrroline, 0.2% to 0.4% of 2-acetylpyridine, 0.5% to 0.9% of ethyl 2-methylpentanoate, 2% to 4% of gamma-decalactone, 0.3% to 0.5% of linalool, 0.1% to 0.3% of alpha-terpineol, 0.2% to 0.4% of 1-octen-3-ol, and 0.4% to 0.6% of phenethyl alcohol,
   (bb) diluting the stock solution by $10^6$ times,
   (cc) adding the rice to the aqueous solution at a ratio of 1:1.0 to 1:1.8, and
   (dd) incubating the rice at 10 to 40° C.

7. The method of claim 1, wherein packaging comprises placing the cooked rice into environment-friendly, high-temperature-resistant, and high-pressure-resistant packaging boxes.

8. The method of claim 1, wherein the average cooling rate of the cooling step is 9 to 11° C. per minute, 7 to 9° C. per minute, or 5 to 7° C. per minute.

9. A cooked rice produced by the method of claim 1.

* * * * *